(No Model.)

A. B. HENDRYX.
CRANK FOR FISHING REELS.

No. 556,540. Patented Mar. 17, 1896.

Witnesses:
J. H. Shumway
Lillian D. Kelsey

Andrew B. Hendryx, Inventor
By Atty. Earle Seymour

UNITED STATES PATENT OFFICE.

ANDREW B. HENDRYX, OF NEW HAVEN, CONNECTICUT.

CRANK FOR FISHING-REELS.

SPECIFICATION forming part of Letters Patent No. 556,540, dated March 17, 1896.

Application filed October 23, 1893. Serial No. 488,850. (No model.)

*To all whom it may concern:*

Be it known that I, ANDREW B. HENDRYX, of New Haven, in the county of New Haven and State of Connecticut, have invented a new Improvement in Cranks for Fishing-Reels; and I do hereby declare the following, when taken in connection with accompanying drawings and the letters of reference marked thereon, to be a full, clear, and exact description of the same, and which said drawings constitute part of this specification, and represent, in—

Figure 1:
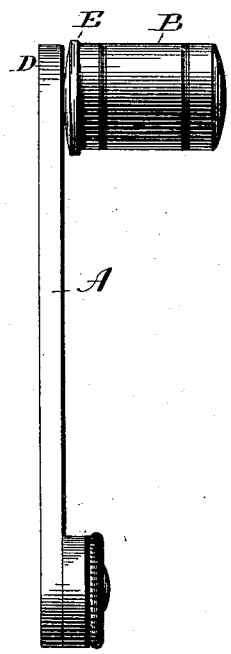
Figure 2:
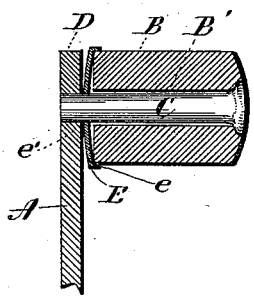

Figure 1, a view in side elevation of a crank for a fishing-reel constructed in accordance with my invention; Fig. 2, a sectional view thereof.

My invention relates to an improvement in cranks for fishing-reels, the object being to produce a crank in which the handle will not rattle, as well as to reduce the expense of making the reel, and to improve its appearance.

With these ends in view my invention consists in the combination, with the handle-arm, handle-pin, and handle of a reel, of a concavo-convex flanged spring-washer interposed between the inner end of the handle and the outer face of the outer end of the handle-arm and mounted upon the handle-pin with its flange capping over the inner end of the handle, which it finishes.

As herein shown, the handle-arm A, handle B, and handle-pin C are of ordinary construction, except that a space D is provided for between the outer face of the outer end of the handle-arm and the inner end of the handle. In this space I locate a concavo-convex sheet-metal washer E, provided upon its outer edge with an outwardly-extending flange e, arranged at a right angle to its plane and adapted to fit snugly over the inner end of the handle, for which it forms a finish. This spring-washer is constructed as to depth so that it will be laterally compressed in the chamber D and exert a constant effort to keep the handle B from either endwise or lateral play on the pin C.

It will be observed that the central opening $e'$ in the washer corresponds exactly to the size of the pin, so that in case the longitudinal opening $B'$ of the handle is made larger than the pin, or wears larger than the same, the handle will not be allowed to rattle, as it is kept centered by the washer with which it is connected through the flange $e$ thereof.

By forming the washer with the flange I stiffen it so that I may employ light meterial in the construction of the washer, and still secure good results. The washer forms an attractive finish for the handle, and effectually prevents the same from the rattling noise which reel-handles often make to the great annoyance of the fisherman.

I am aware that spring-washers have been used in connection with nuts and bolts, and do not therefore wish to be understood as claiming broadly such as my invention; but, Having fully described my invention, what I claim as new, and desire to secure by Letters Patent, is—

The herein-described crank for fishing-reels, consisting of a handle-arm, handle-pin and handle thereof, said handle shorter than said pin, and free to rotate thereon, and a concavo-convex centrally-perforated spring-washer, flanged to receive the inner end of the handle, and interposed between that end of the handle and the outer face of the handle-arm, and placed under tension, its central perforation corresponding in size to the handle-pin, substantially as described, and whereby the handle is prevented from rattling, and kept centered upon the pin.

In testimony whereof I have signed this specification in the presence of two subscribing witnesses.

ANDREW B. HENDRYX.

Witnesses:
 FERDINAND A. WAGNER,
 EDWARD N. PECK.